United States Patent
Kennaley et al.

(10) Patent No.: US 7,147,527 B1
(45) Date of Patent: Dec. 12, 2006

(54) APPARATUS FOR DEPLOYING A ROPE

(76) Inventors: William R. Kennaley, 6071 Carmell Dr., Columbus, OH (US) 43228; James M. Kennaley, 5250 Butternut Dr., Fayetteville, NC (US) 28304

( * ) Notice: Subject to any disclaimer, the term of this patent is extended or adjusted under 35 U.S.C. 154(b) by 0 days.

(21) Appl. No.: 11/099,073

(22) Filed: Apr. 5, 2005

(51) Int. Cl.
*B63C 9/26* (2006.01)

(52) U.S. Cl. .......................................... 441/84; 441/85

(58) Field of Classification Search ............. 441/80–85
See application file for complete search history.

(56) References Cited

U.S. PATENT DOCUMENTS

| | | | |
|---|---|---|---|
| 2,192,203 A | 3/1940 | Purdy | |
| 3,940,133 A | 2/1976 | Civita | |
| 3,974,536 A | 8/1976 | Franklin | |
| RE29,728 E | 8/1978 | Franklin | |
| 4,350,338 A * | 9/1982 | May | 473/423 |
| 4,661,077 A | 4/1987 | Griffith et al. | |
| 5,318,293 A * | 6/1994 | Nathanson et al. | 473/569 |
| 5,611,532 A * | 3/1997 | Forrest, Sr. | 473/576 |
| 5,772,542 A | 6/1998 | Gildea et al. | |
| 5,853,339 A | 12/1998 | Scerbo | |
| 5,976,041 A | 11/1999 | Banker, Sr. | |
| 6,010,419 A * | 1/2000 | Rappaport et al. | 473/613 |
| 6,042,494 A * | 3/2000 | Rappaport et al. | 473/613 |
| 6,171,200 B1 * | 1/2001 | Camp | 473/249 |
| 6,575,799 B1 | 6/2003 | Stimpson et al. | |
| 6,695,728 B1 | 2/2004 | Eddins | |

* cited by examiner

*Primary Examiner*—Ajay Vasudeva
(74) *Attorney, Agent, or Firm*—Mark A. Navarre

(57) ABSTRACT

A miniature foam football with an internal weighting element and a swivel ring or clip is used for deploying a rope. The weighting element is insert-molded in the football foam for low cost of manufacture, and allows the ball to be thrown accurately for distances of up to 100 feet, while retaining overall water buoyancy due to the high buoyancy of the football foam. The swivel ring or clip protrudes from one axial end of the football for quick and easy attachment to the rope, and allows relative rotation between the ball and the rope as the rope is deployed to permit easy and unhindered payout of the rope once the ball has been thrown.

3 Claims, 1 Drawing Sheet

APPARATUS FOR DEPLOYING A ROPE

TECHNICAL FIELD

The present invention relates to apparatus for deploying a rope or lifeline.

BACKGROUND OF THE INVENTION

It is necessary to deploy a rope from one point to another in a variety of circumstances, including water rescue, rock climbing, boating, and so on. However, it is difficult for the average person to accurately deploy a rope, particularly in a panic or high-pressure situation. For this reason, a person will sometimes attach an object to one end of a rope and deploy the rope by throwing the object toward the target location or intended receiver. In water rescue applications, for example, the object attached to the rope may be buoyant such as Styrofoam life saving ring. Objects in the shape of a ball or other commonly thrown item are particularly useful for this purpose since many users already have some experience throwing similar objects. See, for example, the U.S. Pat. No. 3,974,536 to Franklin, where a rope is threaded through an axial passage of a buoyant football-shaped device and knotted at the end to secure the rope to the device. However, devices such as disclosed by Franklin can be difficult to use in practice because the person throwing the ball naturally imparts a spin to the ball, and when the spin is imparted to the rope, the rope tends to kink and fail to deploy properly. Furthermore, it can be difficult to attach a rope to a device such as disclosed by Franklin, particularly in an emergency situation, and such special purposes devices can also be expensive to manufacture. Accordingly, what is needed is an improved apparatus for deploying a rope that is easy to use effectively and inexpensive to manufacture.

SUMMARY OF THE INVENTION

The present invention provides a new and improved apparatus for deploying a rope, including an ellipsoidal (i.e., football-shaped) device having a swivel ring or clip for attachment to one end of the rope to be deployed. The device is preferably a miniature foam football with an internal weighting element to which the swivel ring or clip is secured. The weighting element may be insert-molded in the football foam for low cost of manufacture, and allows the ball to be thrown accurately for distances of up to 100 feet, while retaining overall water buoyancy due to the high buoyancy of the football foam. The swivel ring or clip protrudes from one axial end of the football for quick and easy attachment to the rope, and allows relative rotation between the ball and the rope as the rope is deployed to permit easy and unhindered payout of the rope once the ball has been thrown.

DESCRIPTION OF THE PREFERRED EMBODIMENT

Figure 1:
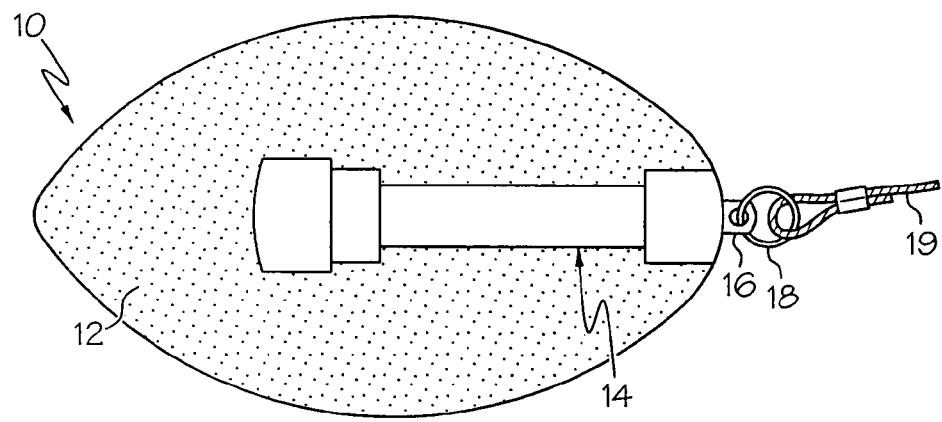
FIG. 1 is a partial cross-sectional view of a football-shaped rope deployment apparatus according to the present invention, including an internal weighting element with an integral swivel ring.
Figure 2:
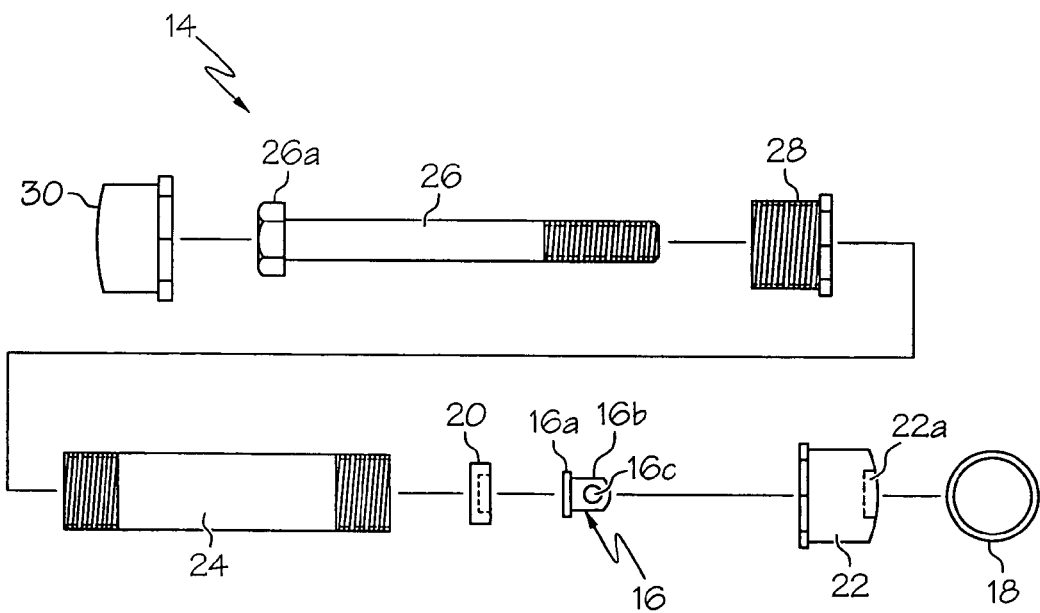
FIG. 2 is an exploded view of the weighting element and swivel ring of FIG. 1.

Referring to FIG. 1, the reference numeral 10 generally designates the rope deployment apparatus of this invention. The apparatus 10 includes a foam football 12 and an internal weighing element 14 having an exposed swivel device 16 for attachment to a ring or clip 18. The weighting element 14, described in detail in FIG. 2, is preferably insert-molded in the football foam during manufacture of the football 12; this is an inexpensive way of manufacturing the device 10, and securely anchors the weighting element 14 within the football foam. In usage, a rope 19 may be tied or otherwise secured to the ring 18, and stored with the apparatus 10 in a bag or other container where it is easily accessible when a need for deploying the rope 19 arises.

The foam football 12 is ellipsoidal in overall shape, and is preferably about 5.5 inches in length and 3.5 inches in diameter at the center thereof. Suitable foam footballs are manufactured by Franklin, Poof, Nerf, and others. Larger foam footballs may be used (such as 8.5 inches in length by 5.0 inches in diameter), but the smaller football can be easily grasped by even a child, and can deploy rope 19 as effectively as the larger football due to the weighting element 14. Also, the smaller size ball is easier to catch, particularly in cases where the ball 12 has been saturated with water.

As indicated above, the weighting element 14 serves at least two functions: (1) imparting sufficient centered throwing weight to the football 12 to enable a person to accurately throw the football and an attached rope 19 long distances, and (2) providing an anchor for the swivel device 16 so that it cannot be pulled out of the football 12. The weighting element should be as heavy as possible without overcoming the saturated buoyancy of the football 12 in water.

FIG. 2 depicts one possible construction of the weighting element 14. Referring to FIG. 2, the swivel device 16 has an integral base 16a that is seated in a plastic cup 20. The body 16b of the swivel device 16 extends through a central axial opening 22a of an internally threaded PVC end cap 22, and the ring or clip 18 is fastened to an aperture 16c in the swivel body as shown in FIG. 1. The end cap 22 is threaded onto one end of an externally threaded PVC pipe 24 and a bolt 26 is inserted into the other end of the pipe 24. When the head 26a of bolt 26 is seated against the pipe 24, the threaded end of bolt 26 abuts the inboard surface of plastic cup 20, holding the cup 20 against the inner periphery of the end cap 22 about the opening 22a; this ensures that the body 16b of swivel device 16 extends through the end cap opening 22a as illustrated in FIG. 1. The head 26a of bolt 26 is held against the pipe 24 by the coupling 28 and the end cap 30. The coupling 28 is threaded both internally and externally; it is threaded onto the inboard end of pipe 24, and the cap 30 is threaded onto the exterior periphery of the coupling 28.

The weighting element 14 illustrated in FIG. 2 comprises parts commonly available to anyone at a hardware store or the like. While this may be advantageous for low volume production, or for demonstrating the invention, it should be understood that the weighting element 14 may be fabricated in a different way, with different materials, and with different kinds of parts.

While the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. Rope deployment apparatus comprising:

a buoyant foam ellipsoidal ball configured to spin about an axis when thrown by a person;

a weighting element within the ellipsoidal ball for adding centered throwing weight to the ellipsoidal ball without overcoming its saturated buoyancy in water;

a swivel device anchored to the weighting element and protruding from an axial end of the ellipsoidal ball, the swivel device being freely rotatable about the axis of said ellipsoidal ball; and a rope coupled at one end to said swivel device, said swivel device allowing relative rotation between the ellipsoidal ball and the rope for unhindered payout of the rope once the ellipsoidal ball has been thrown by the person.

2. The rope deployment apparatus of claim 1, where the weighting element is insert-molded in the ellipsoidal ball.

3. The rope deployment apparatus of claim 1, further comprising:

a ring secured to the swivel device, the rope being attached to the ring.

\* \* \* \* \*